United States Patent
Hessler et al.

(10) Patent No.: US 10,211,904 B2
(45) Date of Patent: Feb. 19, 2019

(54) POWER CONTROL AND BEAMFORMING WITH A PLURALITY OF POWER AMPLIFIERS

(71) Applicant: Telefonaktiebolaget LM Ericsson (publ), Stockholm (SE)

(72) Inventors: Martin Hessler, Linköping (SE); Eleftherios Karipidis, Stockholm (SE); Sven Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 191 days.

(21) Appl. No.: 15/100,401

(22) PCT Filed: Apr. 19, 2016

(86) PCT No.: PCT/EP2016/058658
§ 371 (c)(1),
(2) Date: May 31, 2016

(87) PCT Pub. No.: WO2017/182059
PCT Pub. Date: Oct. 26, 2017

(65) Prior Publication Data
US 2018/0091211 A1    Mar. 29, 2018

(51) Int. Cl.
*H04B 7/00* (2006.01)
*H04B 7/06* (2006.01)
(Continued)

(52) U.S. Cl.
CPC .......... *H04B 7/0691* (2013.01); *H04B 7/0404* (2013.01); *H04B 7/0617* (2013.01);
(Continued)

(58) Field of Classification Search
CPC .......... H04B 7/0617; H04B 2001/0408; H04B 7/0413; H04B 7/0691; H04B 2001/0416; H04B 7/0628; H04B 7/10
(Continued)

(56) References Cited

U.S. PATENT DOCUMENTS 6,188,913 B1 * 2/2001 Fukagawa ............ H01Q 3/2605
342/359
7,602,293 B2 * 10/2009 Taki ..................... G06K 7/0008
340/572.1
(Continued)

FOREIGN PATENT DOCUMENTS

WO    WO 2016/023191 A1    2/2016

OTHER PUBLICATIONS

International Search Report and Written Opinion of the International Searching Authority, Application No. PCT/EP2016/058658, dated Dec. 13, 2016.
(Continued)

*Primary Examiner* — Emmanuel Bayard
(74) *Attorney, Agent, or Firm* — Sage Patent Group (57) ABSTRACT

A communication entity includes an antenna array with different antennas for transmitting and receiving. A combined transmission signal is generated by superposition of the transmission signals from the different antennas. Power amplifiers are each connected to one antenna. A control unit controls an input signal of each power amplifier and generates a directional combined transmission signal by controlling the phase and amplitude of each antenna. The control unit determines a total output power for the directional combined transmission signal, and determines a saturation state in which at least one power amplifier of the connected antenna is operating in a saturation state at maximum power. When the saturation state is detected, the control unit
(Continued)

controls an input signal of at least one non-saturated power amplifier so the power emitted by at least one corresponding antenna connected to the at least one non-saturated power amplifier is increased.

19 Claims, 3 Drawing Sheets

(51) Int. Cl.
*H04B 7/0404* (2017.01)
*H04W 52/14* (2009.01)
*H04W 52/24* (2009.01)
*H04B 1/04* (2006.01)

(52) U.S. Cl.
CPC ........ *H04B 7/0689* (2013.01); *H04W 52/146* (2013.01); *H04W 52/242* (2013.01); *H04B 2001/0416* (2013.01)

(58) Field of Classification Search
USPC .................................................. 375/295–299
See application file for complete search history.

(56) References Cited

U.S. PATENT DOCUMENTS

| | | | | |
|---|---|---|---|---|
| 8,280,426 B2* | 10/2012 | Guo | ..................... | H04B 7/0413 455/522 |
| 2002/0171583 A1* | 11/2002 | Purdy | ..................... | H01Q 3/267 342/368 |
| 2003/0197637 A1* | 10/2003 | Lalezari | ................. | H01Q 1/288 342/354 |
| 2009/0011787 A1* | 1/2009 | Kikuma | ................. | H04B 7/061 455/522 |
| 2010/0220601 A1* | 9/2010 | Vermani | ............... | H04L 1/0025 370/248 |
| 2010/0315699 A1* | 12/2010 | Wang | .................... | H01S 3/1307 359/337.4 |
| 2011/0105174 A1* | 5/2011 | Pelletier | ............. | H04W 52/367 455/522 |
| 2013/0072247 A1* | 3/2013 | Park | ...................... | H04B 7/0408 455/513 |
| 2013/0102345 A1* | 4/2013 | Jung | .................... | H04B 7/0456 455/513 |
| 2013/0194988 A1* | 8/2013 | Kubota | ............. | H04W 52/0216 370/311 |
| 2013/0300499 A1* | 11/2013 | Sharawi | ................... | H03F 3/68 330/124 R |
| 2014/0185481 A1 | 7/2014 | Seol et al. | | |
| 2014/0376654 A1* | 12/2014 | Byun | .................... | H04B 7/024 375/267 |
| 2015/0085838 A1* | 3/2015 | Benjebbour | .......... | H04W 16/28 370/336 |
| 2015/0102859 A1* | 4/2015 | Maniwa | ................ | H03F 3/2176 330/295 |
| 2015/0208345 A1* | 7/2015 | Weissman | ......... | H04W 52/0209 455/574 |
| 2016/0164466 A1* | 6/2016 | Briffa | ........................ | H03F 3/19 330/295 |
| 2016/0191003 A1* | 6/2016 | Yamanouchi | .......... | H04B 1/005 330/295 |
| 2016/0197412 A1* | 7/2016 | Fukuda | .................. | H01Q 23/00 343/861 |
| 2016/0285481 A1* | 9/2016 | Cohen | ...................... | H01Q 3/34 |
| 2017/0279414 A1* | 9/2017 | Sengupta | .................. | H03F 1/26 |
| 2017/0332407 A1* | 11/2017 | Islam | .................. | H04W 52/242 |

OTHER PUBLICATIONS

3GPP, 3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.14.0 (Dec. 2015), 360 pp.

* cited by examiner

POWER CONTROL AND BEAMFORMING WITH A PLURALITY OF POWER AMPLIFIERS

CROSS REFERENCE TO RELATED APPLICATION

This application is a 35 U.S.C. § 371 national stage application of PCT International Application No. PCT/EP2016/058658, filed on Apr. 19, 2016, the disclosure and content of which is incorporated by reference herein in its entirety.

TECHNICAL FIELD

The present invention relates to a communication entity comprising an antenna array and a plurality of power amplifiers. Furthermore a method for operating a communication entity is provided and a computer readable storage medium.

BACKGROUND

In a wireless network a radio receiver is a function in a radio node for receiving radio transmissions from one or multiple radio transmitters. One of the most important and most fundamental problems is to set the output power of the transmitters. In many systems, e.g. LTE (Long Term Evolution), the radio links have a DL (downlink) and an UL (uplink) where a DL is a transmission from a "master" node, e.g. base-station node, that also schedules the radio link and a UL is a transmission from a slave node, e.g. UE (user entity), scheduled from the master node.

Typically, a base-station node sets the output power of the transmitters aiming for a determined received power in both UL and DL. The DL power often is a fixed power density at the base-station side according to the maximum power of the base-station. The UL power is determined by a procedure by which the base station transmits a DL reference signal that the UEs measure on and adapt their output power in order to make the received power density at the base station of all UL transmissions to be more or less the same. In LTE, how close the received power densities of different UL transmissions are, is determined by α in formula (1) below, where α=1 gives the same received power density. For the uplink data channel PUSCH (Physical Uplink Shared Channel) in LTE, the transmitted power by the UE in subframe i is determined by the formula:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad (1)$$

where $P_{CMAX}$ is the configured maximum UE transmit power, $M_{PUSCH}$ is the number of resource blocks allocated for the UE, $P_{O\_PUSCH}$ (j) is a parameter consisting of the sum of a cell-specific and a UE-specific part provided by higher layer, j can be 0 or 1, α is cell-specific parameter configured by higher layers (also known as fractional pathloss compensation factor), PL is the downlink pathloss estimate calculated in the UE, $\Delta_{TF}$ (i) is a UE-specific parameter provided by higher layers and f(i) is UE-specific correction term controlled by TPC (Transmit Power Control) commands sent in uplink grants sent on the PDCCH (Physical Downlink Control Channel). For later releases of the 3GPP specifications power control is slightly more complicated due to the support of multi-carrier where the UE can support multiple serving cells.

The trend in advanced multi-antenna transmitters is that the common power amplifier (PA) that typically feeds all antennas is being replaced by distributed PAs, one per antenna element or subarray. In emerging systems, operating at higher than current cellular frequencies, e.g. mm-Wave, distributed PAs will be used not only for the base stations but also for the UEs, as it is likely that the radio will be integrated with the antennas. Power control for distributed PAs is then an even more complicated issue, due to the interplay with beamforming.

In current solutions for uplink power control with beamforming (jointly called precoding) in the case of distributed PAs, there are two dominant approaches, each of which has its advantages and disadvantages. The first approach is to use a phase-only precoder which is able to transmit at full power, i.e. exploiting equally well all PAs. From the perspective of a single link, this is needed in coverage limited situations. The problem with phase only precoding is that it has higher side-lobes (compared to an optimal precoder including amplitude tapering) and thus spreads more interference which has the effect of deteriorating the system performance.

The second approach is to find the optimum beamforming as if there was a common PA, but then normalize the output power in order not to saturate the PA with highest load. The effect is that the received signal quality deteriorates prematurely for cell edge users, either due to too low received power or also in some cases due to clipping. This is especially bad in code-multiplex systems, e.g. for uplink sounding signals in 5G for massive MIMO (Multiple Input Multiple Output).

Accordingly a need exists to provide an enhanced power control mechanism by which a defined signal quality can be maintained longer. Furthermore, interference with other communication entities shall be minimised.

SUMMARY

This need is met by the features of the independent claims. Further embodiments are described in the dependent claims.

According to a first aspect a communication entity is provided comprising an antenna array with a plurality of different antennas for transmitting and receiving signals, wherein a combined transmission signal is generated by a superposition of the transmission signals from the plurality of different antennas of the antenna array. The communication entity furthermore comprises a plurality of power amplifiers, each power amplifier being connected to one of the antennas or subarrays. A control unit is provided configured to control an input signal of each of the plurality of power amplifiers and configured to generate a directional combined transmission signal by controlling the phase and amplitude scaling of the signal transmitted by each antenna of the array. The control unit is configured to determine a total output power for the directional combined transmission signal and is configured to determine a saturation state in which at least one power amplifier of the connected antennas is operating in a saturation state at maximum power. When the saturation state is detected for said at least one power amplifier, the control unit is configured to control the input signal of at least one non-saturated power amplifier in such a way that the power emitted by at least one corresponding antenna connected to the at least one non-saturated power amplifier is increased.

The advantage of this behaviour is that with this improved power control mechanism the communication entity can maintain the signal quality determined by the received power for higher values of the path loss. Furthermore, the directional combined transmission signal is kept in the desired direction so that interference at other communication entities is decreased compared to the phase-only precoder.

Furthermore, a method for operating the communication entity is provided wherein the method is carried out as mentioned above or as described in further detail below.

The method comprises the steps of controlling an input signal of each of the plurality of power amplifiers and generating a directional combined transmission signal by controlling a phase and amplitude of each antenna of the array. Furthermore a total power output for the directional combined transmission signal is determined. Additionally a saturation state is determined in which at least one power amplifier of the connected antenna is operating in a saturation state at a maximum power, wherein when the saturation state is detected for said at least one power amplifier, an input signal of at least one non-saturated power amplifier is controlled in such a way that the power emitted by at least one corresponding antenna connected to the at least one non-saturated power amplifier is increased.

Furthermore a computer readable storage medium is provided having stored thereon a computer program, wherein execution of the computer program by at least one processor of the communication entity causes the at least one processor to carry out a method for operating a communication entity as mentioned above.

It should be understood that the features mentioned above and features yet to be explained below can be used not only in the respective combinations indicated, but also in other combinations or in isolation without departing from the scope of the present invention. Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings, in which like reference numerals refer to like elements.

DETAILED DESCRIPTION OF EMBODIMENTS

In the following, embodiments of the invention will be described in detail with reference to the accompanying drawings. It should be understood that the following description of embodiments is not to be taken in a limiting sense. The scope of the invention is not intended to be limited by the embodiments described hereinafter or by the drawings which are to be illustrative only.

The drawings are to be regarded as being schematic representations, and elements illustrated in the drawings are not necessarily shown to scale. Rather, the various elements are represented such that their function and general-purpose becomes apparent to a person skilled in the art. Any connection or coupling between functional blocks, devices, components or physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Figure 1:
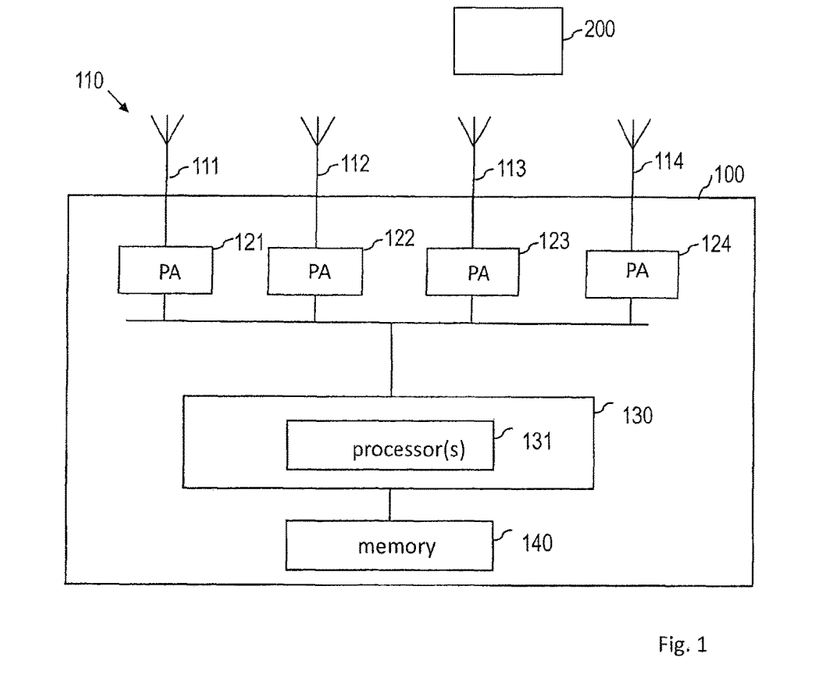
FIG. 1 shows a schematic representation of a communication entity which can control the transmission power in a saturation state in an optimized way.

Hereinafter techniques are described how a multi-antenna communication entity, e.g. a UE, with distributed power amplifiers that transmit towards a node e.g. a base station can be designed and operated. FIG. 1 shows a schematic view of such a communication entity 100. The communication entity 100 comprises an antenna array 110 with a plurality of antennas 111 to 114. Each of the antennas is connected to a power amplifier such as power amplifiers 121 to 124. Furthermore, a control unit 130 is provided which is able to control the input signal to the power amplifiers and is configured to generate a directional combined transmission signal by controlling the phase and amplitude of each antenna of the array 110. The control unit is able and responsible to determine beamforming weights to the different antennas that are needed to generate the directional combined transmission signal. Accordingly the control unit may incorporate baseband and/or radio processing capabilities, whereas the power amplifiers 121 to 124 may only control the amplitude scaling of the signals. The control unit 130 may comprise one or more processors which are provided to control the operation of the communication entity. The at least one processor may be a multicore processor. The communication entity 100 furthermore comprises a memory 140 which can store a program code that can be executed by the at least one processing unit 131. Executing the program code can cause the communication entity to perform techniques described above or described in more detail below. The antenna array 110 can be considered as interface which is used for the communication with other entities wherein this interface is used as transmitter for the transmission of user data or control messages to other entities and can be considered as a receiver unit providing the possibility to receive user data or control messages from other entities.

The communication entity 110 can, in a power control procedure estimate the path loss towards a node B 200 which is shown in FIG. 1 as the other communication entity such as the base station with which the communication entity 100 is in communication. When the path loss towards the reception entity or node B 200 is known the beamforming vector w can be estimated that is used for the transmission. The beamforming vector helps to define the directional combined transmission signal transmitted by all of the antennas 111 to 114. The path loss factor and beamforming vector w are used to estimate the total transmit power needed in order to achieve a desired power density, which may be a received power density given by formula 1 mentioned above. If the estimated transmit power results in a power saturation state in which one of the power amplifiers 121 to 124 operates at full power, the communication entity 100 compensates the saturation by increasing the input signal power of non-saturated power amplifiers.

As will be explained in more detail below the power control mechanism is such that the power at the non-saturated power amplifiers is augmented with an additional term B which compensates for the loss due to the power saturation.

This is explained in further detail below. If the above mentioned formula 1 is used, some terms can be removed as a can be set to 1 and M can be set to 1 wherein P is defined as $P \triangleq P_{PUSCH}$ and $P_{target} \triangleq P_{O\_PUSCH}$ so that formula 1 simplifies to formula 2

$$P = P_{target} + PL \quad (2)$$

The last two terms of formula 1 can be omitted when no power value is received from the base station. For simplicity of exposition it is in the following also assumed that all N power amplifiers are identical i.e. have maximum output power.

$$P_{MAX} = P_{CMAX}/N$$

In the known art given a beamforming vector with $\|w\|=1$, typical methods to obtain a pre-coder that satisfies the distributed power amplifier constraints are as follows:

In one of them the precoder which incorporates the total power P and beamforming vector w becomes:

$$w_{effective} = \text{clip}\{\sqrt{P}w, \sqrt{P_{MAX}}\} \quad (3)$$

This is a solution known in the art. In this equation 3, the expression clip means that the corresponding power amplifier does not output power at the desired power level. The problem with the effective pre-coder determined by this clip operation is that the beamforming characteristics are allowed to be altered when one or multiple power amplifiers can become saturated and would run at a maximum power. In another method known in the art this is avoided by setting the effective transmit power of each power amplifier as:

$$P_{effective} \text{ determind as } P_{effective} = \quad (4)$$
$$P \text{ if } P\|w\|_{MAX}^2 P_{MAX} \text{ else } P_{effective} = P_{MAX}/\|w\|_{MAX}^2$$

where $\|\ \|_{MAX}$ is the infinity norm, meaning that it gives the value of the element and the vector with the highest absolute value. Hence the wanted beamforming characteristics are maintained as it is avoided to clip or downscale any elements in the pre-coder. Normally, all elements in the precoder are downscaled in the same way. By that, the effective precoder will transmit with a pattern shape identical to w but with less power transmitted. Thus the other prior art solution is as follows:

$$w_{effective} = \sqrt{P_{effective}} w \quad (5)$$

The problem of the above solution is that the effective pre-coder determined with the operation of equation 5 induces a power loss.

In the following, the embodiment of the invention is discussed in which it is proposed to hyper-linearly scale the power with a boost factor B when one of the power amplifiers is on the saturation stated:

$$|w^H \text{clip}\{B\sqrt{P}w, \sqrt{P_{MAX}}\}|^2 = P \quad (6)$$

The hyper-linearly scale means that the other non-saturated power amplifiers are increased more than what the increase would be if the path gain were used.

The power is increased to maintain the wanted power in the direction of the pre-coder w. In this context it can be observed that if w is determined from the true normalized channel, the formula will perfectly maintain the received power at the receiver. The value of B fulfilling the equation can be e.g. obtained by an iterative line search algorithm. For a very high path loss, all power amplifiers will become saturated and hence there will be no value of B fulfilling the equation. In such a case B can be simply set according to any sufficient large value such as $$B = \sqrt{P_{MAX}} / \|w\|_{MIN>0}^2$$

this means that B is sufficiently large resulting in that the smallest non-zero element in w is scaled to give maximum output power.

In another example instead of using the projection of the wanted pre-coder w, the projection on the estimated channel h is used instead. This means:

$$|h^H \text{clip}\{B\sqrt{P}w, \sqrt{P_{MAX}}\}| = P_{target} \quad (7)$$

This is potentially better when the pre-coder is not determined from the channel h, by way of example when w is signaled from the base station according to a limited codebook, but still demands knowledge of the channel h at the communication entity which is not always available.

Figure 4:
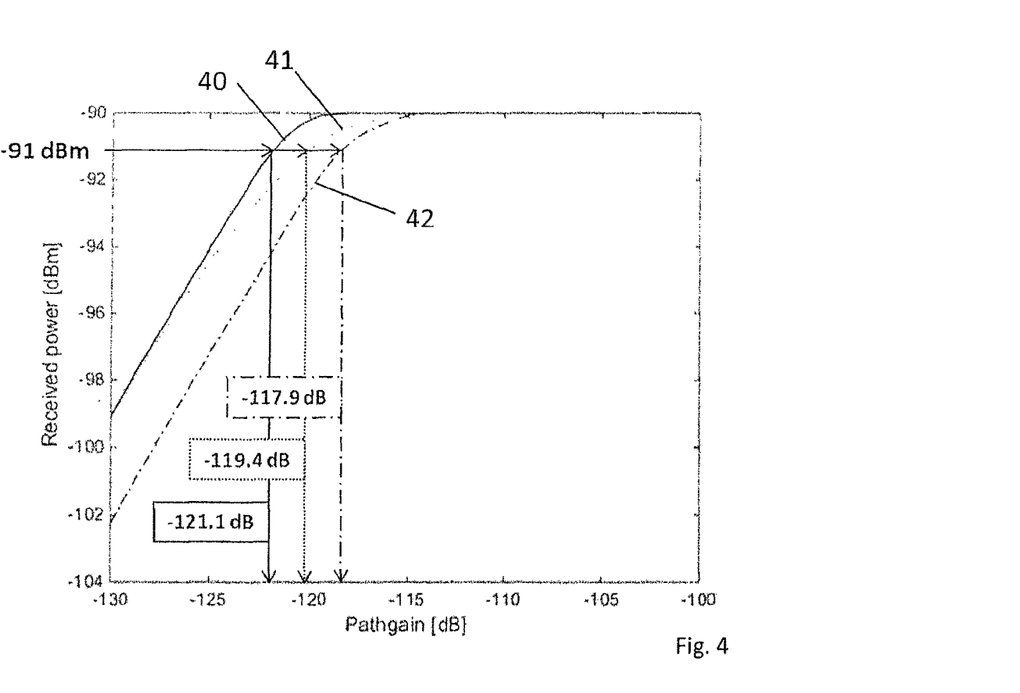
FIG. 4 shows a graph indicating a cell edge comparison between the invention and solutions known in the art.
Figure 5:
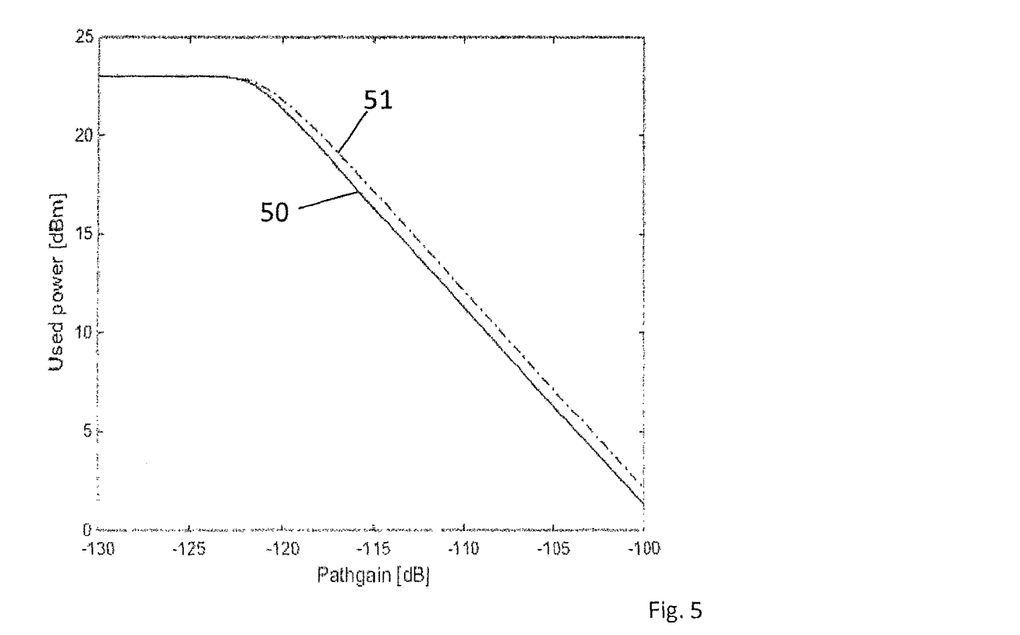
FIG. 5 shows a graph indicating the use power in an embodiment of the invention compared to a solution of the prior art.

FIG. 4 indicates the result for the received power at the base station for the solution discussed above. It can be deduced from FIG. 4 what the effect of the power amplifier limitation is when the solution of the prior art mentioned by equation 3 is used. The limitation is mainly due to amplitude variation in the vector w. In the example shown, it is considered that transmitter antennas are used and independent equal magnitude Rayleigh fading per antenna and a −90 dBm target is used. It can be seen that performance at −1 dB power offset is improved by 1.5 dB by the invention indicated by graph 40 compared to the solution indicated above by equation 3 and graph 41 and even improved by around 3.2 dB compared to the known solution given by equation 5 and graph 42. A phase only strategy would give the same received power as described in the above embodiment of the invention, but would create more interference. The result of the total power transmitted for the 23 dBm communication entity is indicated in FIG. 5. The power is proportional to the amount of interference created. From FIG. 5 it can be seen why the phase only pre-coder of the prior art indicated by graph 51 is not a good choice in general despite giving the same received power at the base station as the proposed solution shown by graph 51. It can be seen that for higher path gain values the output power of the embodiment of the invention is about 0.90 dB lower than the phase only pre-coder and gives a substantial reduction in interference.

Concerning the hyper linear scaling mentioned above, it is explained in connection with FIG. 4. Consider as an example that the situation starts with a non-saturated situation with −115 dB path-gain and the UE moves to saturated state at −120 dB path-gain. Then, for example, due to saturation the beam-forming gain can drop from 9 dB to 8 dB. Hence if only linear increase in power is applied the −90 dBm target is not meet. But, with a hyper-linear scaling that gives an additional 1 dB power increase, the power target is achieved unless additional PAs become saturated from this 1 dB increase (then even higher power is needed).

In the following, an example search is given which is used to search a value of B.

```
If1 |w^H clip {B√P̄ w,√P_{MAX}}|^2 < P
    While |w^H clip {B√P̄ w,√P_{MAX}}|^2 < P AND B < √P_{MAX} ||w||_{MIN>0}^2
        B→B_low
        2B→B
    Endwhile
    While ||w^H clip {B√P̄ w,√P_{MAX}}|^2 − P| > epsilon
        If2 |w^H clip{(B + B_{low})/2√P̄w, √P_{MAX}}|^2 ≥ P
            (B+B_low)/2→B
        Else
            (B+B_low)/2→B_low
        Endif2
    Endwhile
Endif1
```

Figure 2:
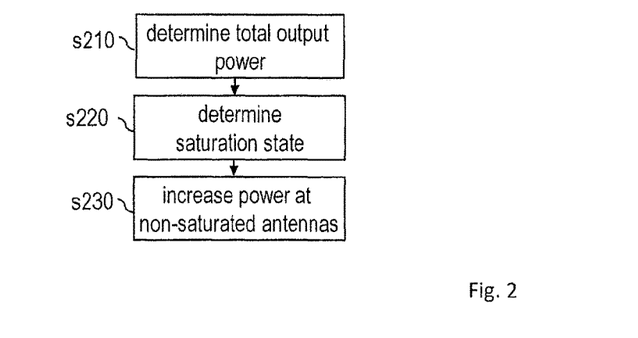
FIG. 2 shows an example flowchart comprising steps carried out by the communication entity of FIG. 1 in order to optimize the output in a saturation state.

FIG. 2 summarizes some of the main steps carried out by the communication entity 100 shown in FIG. 1. In step S 210 a total power output needed at the communication device is determined. In step S 220 a saturation state is detected meaning that at least one of the power amplifiers 121 to 124 is operating in a saturated state. As a reaction to the saturation state the power of the non-saturated antennas is increased in step S 230.

Figure 3:
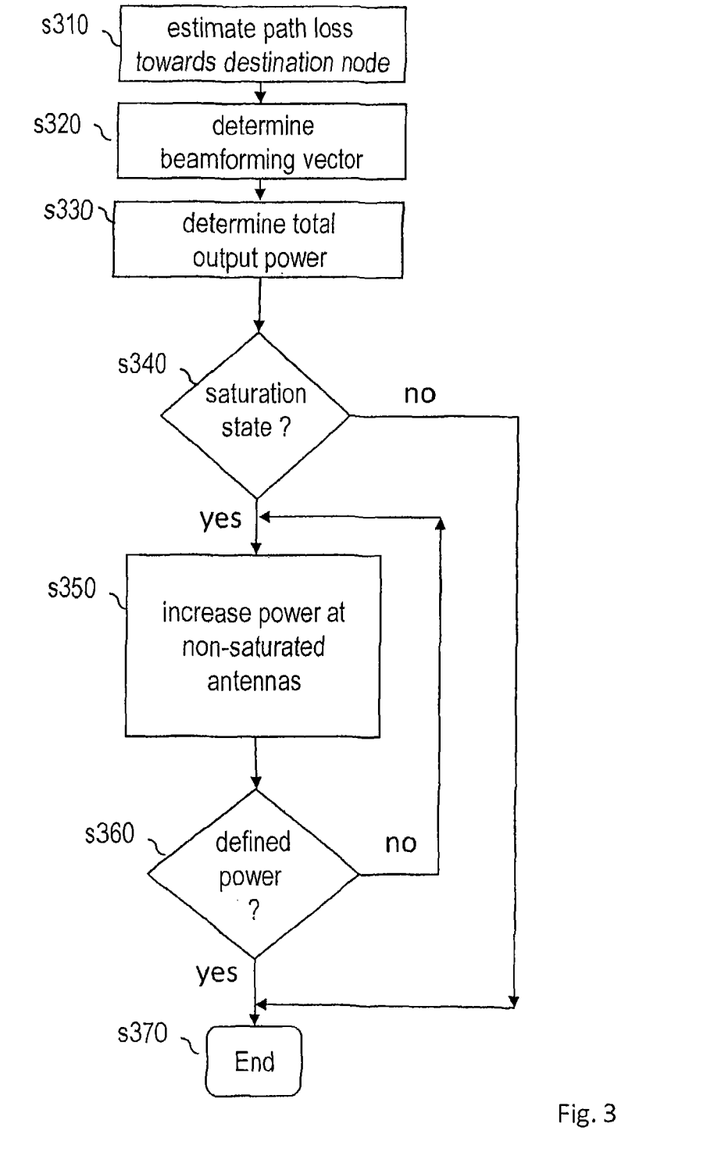
FIG. 3 shows an example flowchart comprising the steps carried out by the communication entity of FIG. 1 in a further embodiment of an optimized power control in a saturation state.

FIG. 3 provides a more detailed view of a method carried out at the communication entity 100. In step S 310 a path loss is estimated towards a destination node such as node 200 of FIG. 1. In the next step S 320 a beamforming vector w is determined in order to obtain a desired power at the destination node. In step 330 the total output power is determined for the communication entity. In step S 340 it is checked whether a saturation state is present meaning that at least one of the amplifiers is operating at maximum power. If this is the case, the power at the remaining antennas is increased in step S 350. In step S 360 it is checked whether the defined power is obtained. If this is not the case, the power is further increased until the desired power is obtained. When no saturation state is detected in step S 340 it directly ends in step S 370.

In the embodiment shown in FIG. 1 a single control 130 was used to control the phase and the amplitude of the different antennas. In an alternative embodiment, the control unit can be split into two parts and two corresponding sub-control units. If the beamforming weights are given and determined and applied previously by a first sub control unit, the second sub-control unit would be only responsible for checking whether the precoding, the combination of the beamforming and power scaling can be implemented for the given beamforming vector with the given power amplifiers to meet the defined received power. If not, due to power amplifier saturation, then the second sub-control unit would control the power and thus only the amplitude of the signals of the non-saturated power amplifiers. This means that the phase scaling remains intact and it can be assumed that this phase was already configured by the first sub control unit.

From the above said, some general conclusions can be drawn.

As far as the communication entity is concerned, the control unit is configured to estimate a path loss towards a destination node of the combined transmission signal transmitted by the communication entity towards the destination node. Furthermore, the communication entity is configured to determine a beamforming vector w for the transmission to the destination node in order to obtain a defined power at the destination node, wherein the beamforming vector w indicates an amplitude and a phase scaling for the signal of each of the antennas of the antenna array.

Here, the control unit may control an input signal of at least one non-saturated power amplifiers in such a way that the defined power is maintained at the destination node unless all the non-saturated power amplifiers operate in saturation.

When said at least one power amplifier is in the situation state, the control unit preferably maintains the power amplifier with the connected antenna at maximum power and increases the power at the non-saturated power amplifier such that the defined power at the destination node is maintained.

It is possible that the control unit is increasing the power at the remaining power amplifiers for each of the remaining antennas by a constant factor B.

In another option it is possible, that the factor B is determined individually for each power amplifier so that different factors B may result for the different power amplifiers.

Furthermore it is possible that the control unit estimates a communication channel from the communication entity to a destination node of the signals transmitted by the communication entity towards the destination node, and the control unit adapts the input signal at the at least one non-saturated power amplifier in the saturation state based on the estimated communication channel. Furthermore, the power at the least one non-saturated power amplifier can be increased where the phase of all antennas of the antenna array and a direction of the directional combined transmission signal are kept constant.

The computer readable storage medium on which a computer program is stored to carry out the above discussed steps could be any computer readable signal medium. A computer readable storage medium may be, for example, but not limited to, an electronic, magnetic, optical, electromagnetic, a semiconductor system, apparatus, or device, or any suitable combination of the foregoing. More specific examples of the computer readable storage medium would include the following: an electrical connection having one or more wires, a portable computer diskette, a hard disk, a random access memory, RAM, a read-only memory, ROM, and erasable programmable read-only memory, EEPROM or flash memory, an optical fiber, a portable compact disc read-only memory, CD ROM, an optical storage device, a magnetic storage device, or any suitable combination of the foregoing. In the context of this document, a computer readable storage medium may be any tangible medium that can contain or store a program for use by or in combination with an instruction execution system apparatus or device.

The advantage of the above described method is the provision of an enhanced power control mechanism in which power limited nodes such as the communication device can maintain the signal quality determined by the received power longer compared to systems known in the prior art. This improves inter alia the uplink cell edge bitrate which is a performance metric that is commonly the most difficult and most important to improve. A further advantage in comparison to an embodiment of the prior art is a reduction in interference at non-cell edge by roughly 1 dB.

The invention claimed is:

1. A communication entity comprising:
an antenna array with a plurality of different antennas for transmitting and receiving signals, wherein a combined transmission signal is generated by a superposition of the transmission signals from the plurality of different antennas of the antenna array,
a plurality of power amplifiers, each power amplifier being connected to one of the antennas, and
a control unit configured to control an input signal of each of the plurality of power amplifiers and configured to generate a directional combined transmission signal by controlling the phase and amplitude of each antenna of the array, wherein the control unit is configured:
to determine a total output power for the directional combined transmission signal,
to estimate a path loss towards a destination node of the directional combined transmission signal transmitted by the communication entity towards the destination node, the communication entity being a mobile user entity used for communication in a cellular network,
to determine, based on the estimate of the path loss, a beamforming vector w for the transmission to the destination node in order to obtain a defined power of the directional combined transmission signal that will be received at the destination node, the beamforming vector w indicating an amplitude and a phase scaling for the signal of each of the antennas of the antenna array, and
to determine a saturation state in which at least one power amplifier of the connected antenna is operating in a saturation state at maximum power, wherein when the saturation state is detected for the at least one power amplifier, the control unit is configured to control an input signal of at least one non-saturated power amplifier, responsive to the amplitude and the phase scaling indicated by the beamforming vector w determined for each of the at least one non-saturated power amplifier, in such a way that the power emitted by at least one corresponding antenna connected to the at least one non-saturated power amplifier is increased.

2. The communication entity according to claim 1, wherein the control unit is configured to control the input signal of the at least one non-saturated power amplifier in such a way that the defined power is maintained at the destination node unless all the non saturated power amplifiers operate in saturation.

3. The communication entity according to claim 1, wherein when the at least one power amplifier is in the saturation state the control unit is configured to maintain the power amplifier with the connected antenna at maximum power, and to increase the power at the at least one non saturated power amplifier such that the defined power at the destination node is maintained.

4. The communication entity according to claim 2, wherein the control unit is configured to increase the power at the non saturated amplifiers for each of the remaining antennas by a constant factor B.

5. The communication entity according to claim 4, wherein B is determined by the following equation:

$$|w^H \text{clip}\{B\sqrt{P}w, \sqrt{P_{MAX}}\}|^2 = P.$$

6. The communication entity according to claim 1, wherein the control unit is configured to estimate a communication channel from the communication entity to a destination node of the signals transmitted by the communication entity towards the destination node, wherein the control unit is configured to adapt the input signal at the at least one non-saturated power amplifier in the saturation state based on the estimated communication channel.

7. The communication entity according to claim 1, wherein the control unit is configured to increase the power of the at least one non saturated power amplifier while the phase of the directional combined transmission signal is kept constant.

8. The communication entity of claim 1, wherein the plurality of power amplifiers comprises:
a first power amplifier in a saturation state at maximum power;
a second power amplifier in a non-saturated state; and
a third power amplifier in a non-saturated state,
wherein in response to the saturation state being detected for the first power amplifier, the control unit is further configured to control a first input signal to the second power amplifier and a second input signal to the third power amplifier based on both the amplitude and the phase scaling indicated by the beamforming vector w, in such a way that first power emitted by a first corresponding antenna connected to the second power amplifier increases by a different amount than second power emitted by a second corresponding antenna connected to the third power amplifier.

9. The communication entity of claim 1, wherein the control unit is configured to estimate the path loss towards the destination node prior to transmission of the combined transmission signal and independent of information received from the destination node, the destination node being a base station in the cellular network.

10. A method for operating a communication entity, the communication entity comprising an antenna array with a plurality of different antennas for transmitting and receiving signals wherein a combined transmission signal is generated by a superposition of the transmission signals from the plurality of different antennas of the antenna array, and a plurality of power amplifiers, each power amplifier being connected to one of the antennas, the method comprising:
controlling an input signal of each of the plurality of power amplifiers and generating a directional combined transmission signal by controlling a phase and amplitude of each antenna of the antenna array,
determining a total output power for the directional combined transmission signal,
estimating a path loss towards a destination node of the combined transmission signal transmitted by the communication entity towards the destination node, the communication entity being a mobile user entity used for communication in a cellular network,
determining a beamforming vector w for the transmission to the destination node in order to obtain a defined power at the destination node, the beamforming vector w indicating an amplitude and a phase scaling for each signal of the antennas of the antenna array, and
determining a saturation state in which at least one power amplifier of the connected antenna is operating in a saturation state at maximum power, wherein when the saturation state is detected for the at least one power amplifier, an input signal of at least one non-saturated power amplifier is controlled in such a way that the power emitted by at least one corresponding antenna connected to the at least one non-saturated power amplifier is increased.

11. The method according to claim 10, wherein the at least one non saturated power amplifier is controlled in such a way that the defined power is maintained at the destination node unless all the non-saturated power amplifiers operate in saturation.

12. The method according to claim 10, wherein when the at least one power amplifier is in the saturation state, the power amplifier with the connected antenna is maintained at maximum power, and the power at the at least one non-saturated power amplifier is increased such that the defined power at the destination node is maintained.

13. The method according to claim 10, wherein the power at the remaining power amplifiers is increased for each of the remaining antennas by a constant factor B.

14. The method according to claim 10, further comprising the step of estimating a communication channel from the communication entity to a destination node of the signals transmitted by the communication entity towards the destination node, wherein the power at the at least one non-saturated power amplifier is adapted in the saturation state based on the estimated communication channel.

15. The method of claim 10, wherein determining the saturation state further comprises determining a first power amplifier of the connected antenna is operating in a saturation state at maximum power, the method further comprising in response to the saturation state being detected for the first power amplifier, controlling a first input signal to a second power amplifier and a second input signal to a third power amplifier based on both the amplitude and the phase scaling indicated by the beamforming vector w, in such a way that first power emitted by a first corresponding antenna connected to the second power amplifier increases by a different amount than second power emitted by a second corresponding antenna connected to the third power amplifier.

16. The method of claim 10, wherein estimating the path loss towards the destination node comprises estimating the path loss towards the destination node prior to transmission of the combined transmission signal and independent of information received from the destination node, the destination node being a base station in the cellular network.

17. A computer program product comprising a non-transitory computer readable storage medium, having stored thereon a computer program, wherein execution of the computer program by at least one processor of a communication entity causes the at least one processor to execute a method for operating the communication entity, wherein the communication entity comprises:
    an antenna array with a plurality of different antennas for transmitting and receiving signals, wherein a combined transmission signal is generated by a superposition of the transmission signals from the plurality of different antennas of the antenna array, and
    a plurality of power amplifiers, each power amplifier being connected to one of the antennas, the method comprising:
        controlling an input signal of each of the plurality of power amplifiers and generating a directional combined transmitter signal controlling a phase and amplitude of each antenna of the antenna array,
        determining a total output power for the directional combined transmission signal,
        estimating a path loss towards a destination node of the combined transmission signal transmitted by the communication entity towards the destination node, the communication entity being a mobile user entity used for communication in a cellular network,
        determining a beamforming vector w for the transmission to the destination node in order to obtain a defined power at the destination node, the beamforming vector w indicating an amplitude and a phase scaling for each signal of the antennas of the antenna array, and
        determining a saturation state in which at least one power amplifier of the connected antenna is operating in a saturation state at maximum power, wherein when the saturation state is detected for the at least one power amplifier, an input signal of at least one non-saturated power amplifier is controlled in such a way that the power emitted by at least one corresponding antenna connected to the at least one non-saturated power amplifier is increased.

18. The computer program product of claim 17, wherein the plurality of power amplifiers comprises:
    a first power amplifier operating in a saturation state at maximum power;
    a second power amplifier operating in a non-saturated state; and
    a third power amplifier operating in a non-saturated state, wherein the method further comprises in response to the saturation state being detected for the first power amplifier, the control unit is further configured to control a first input signal to the second power amplifier and a second input signal to the third power amplifier based on both the amplitude and the phase scaling indicated by the beamforming vector w, in such a way that first power emitted by a first corresponding antenna connected to the second power amplifier increases by a different amount than second power emitted by a second corresponding antenna connected to the third power amplifier.

19. The computer program product of claim 17 wherein estimating the path loss towards the destination node comprises estimating the path loss towards the destination node prior to transmission of the combined transmission signal and independent of information received from the destination node, the destination node being a base station in the cellular network.

\* \* \* \* \*

UNITED STATES PATENT AND TRADEMARK OFFICE
CERTIFICATE OF CORRECTION

PATENT NO. : 10,211,904 B2
APPLICATION NO. : 15/100401
DATED : February 19, 2019
INVENTOR(S) : Hessler et al.

It is certified that error appears in the above-identified patent and that said Letters Patent is hereby corrected as shown below:

In the Specification

In Column 1, Line 54, delete "$M_{PUSCH}$" and insert -- $M_{PUSCH}(i)$ --, therefor.

In Column 1, Line 57, delete "a" and insert -- α --, therefor.

In Column 3, Line 57, delete "use power" and insert -- use of power --, therefor.

In Column 4, Line 48, delete "communication entity 110" and insert -- communication entity 100 --, therefor.

In Column 4, Line 49, delete "node B 200" and insert -- nodeB 200 --, therefor.

In Column 5, Line 6, delete "a can be" and insert -- α can be --, therefor.

In Column 5, Lines 23-25, delete "$W_{effective} = clip\{\sqrt{P}w, \sqrt{P_{MAX}}\}$" and insert -- $W_{effective} = clip\{\sqrt{P}w, \sqrt{P_{MAX}}\}$ --, therefor.

In Column 5, Lines 50-51, delete "$W_{effective} = \sqrt{P_{effective}}w$" and insert -- $W_{effective} = \sqrt{P_{effective}}\,w$ --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,211,904 B2

In Column 5, Lines 59-60, delete " $|w^H \text{clip}\{B\sqrt{P}w,\sqrt{P_{MAX}}\}|^2 = P$ "
and insert -- $|w^H clip\{B\sqrt{P}\ w, \sqrt{P_{MAX}}\}|^2 = P$ --, therefor.

In Column 6, Line 20, delete " $|h^H \text{clip}\{B\sqrt{P}w,\sqrt{P_{MAX}}\}|=P_{target}$ " and
insert -- $|h^H clip\{B\sqrt{P}\ w, \sqrt{P_{MAX}}\}|^2 = P_{target}$ --, therefor.

In Column 6, Line 26, delete "result for the" and insert -- result in the --, therefor.

In Column 7, Lines 1-13, delete
```
If1 |w^H clip {B√P w,√P_MAX}|^2 < P
    While |w^H clip {B√P w,√P_MAX}|^2 < P AND B < √P_MAX}||w||_MIN>0^2
        B→B_low
        2B→B
    Endwhile
    While ||w^H clip {B√P w,√P_MAX}|^2 − P| > epsilon
        If2 |w^H clip{(B + B_low)/2√P w, √P_MAX}|^2 ≥ P
            (B+B_low)/2→B
        Else
            (B+B_low)/2→B_low
        Endif2
    Endwhile
Endif1
```
" and insert

```
If1 |w^H clip {B√P w, √P_MAX}|² < P
    While |w^H clip {B√P w, √P_MAX}|² < P AND B < √P_MAX ||w||²_MIN>0
        B → B_low
        2B → B
    Endwhile While ||w^H clip {B√P w, √P_MAX}|² - P| > epsilon
        If2 |w^H clip{(B + B_low)/2 √P w, √P_MAX}|² ≥ P
            (B+B_low)/2 → B
        Else
            (B+B_low)/2 → B_low
        Endif2
    Endwhile
Endif1
```
--, therefor.

In Column 7, Lines 25-26, delete "node 200 of FIG. 1." and insert -- nodeB 200 of FIG. 1. --, therefor.

In Column 7, Line 28, delete "step 330" and insert -- step S 330 --, therefor.

In Column 8, Line 18, delete "situation" and insert -- saturation --, therefor.

In Column 8, Lines 37-38, delete "the power at the least one" and insert -- the power at the at least one --, therefor.

In Column 8, Line 55, delete "CD ROM," and insert -- CD-ROM, --, therefor.

In the Claims

In Column 9, Line 66, in Claim 5, delete

" $|w^H clip\{B\sqrt{P}w, \sqrt{P_{MAX}}\}|^2 = P.$ " and insert

-- $|w^H clip\{B\sqrt{P} w, \sqrt{P_{MAX}}\}|^2 = P.$ --, therefor.